(12) United States Patent
Artal Soriano et al.

(10) Patent No.: US 12,248,137 B2
(45) Date of Patent: Mar. 11, 2025

(54) INSTRUMENT FOR MANIPULATING A LIGHT WAVEFRONT AND METHOD FOR MANIPULATING A LIGHT WAVEFRONT

(71) Applicant: VOPTICA S.L., Murcia (ES)

(72) Inventors: Pablo Artal Soriano, Murcia (ES); Alba Paniagua Diaz, Murcia (ES); Augusto Arias Gallego, Murcia (ES); Javier Roca Alcaraz, Murcia (ES); Pedro Prieto Corrales, Murcia (ES)

(73) Assignee: VOPTICA S.L., Murcia (ES)

( * ) Notice: Subject to any disclaimer, the term of this patent is extended or adjusted under 35 U.S.C. 154(b) by 237 days.

(21) Appl. No.: 18/030,114

(22) PCT Filed: Oct. 4, 2021

(86) PCT No.: PCT/ES2021/070719
§ 371 (c)(1),
(2) Date: Apr. 4, 2023

(87) PCT Pub. No.: WO2022/074272
PCT Pub. Date: Apr. 14, 2022

(65) Prior Publication Data
US 2023/0350189 A1 Nov. 2, 2023

(30) Foreign Application Priority Data
Oct. 6, 2020 (ES) ................. P202031012

(51) Int. Cl.
*G02B 26/06* (2006.01)
*G02F 1/01* (2006.01)

(52) U.S. Cl.
CPC ........... *G02B 26/06* (2013.01); *G02F 1/0102* (2013.01); *G02F 1/0126* (2013.01)

(58) Field of Classification Search
CPC ...... G02B 26/06; G02F 1/0102; G02F 1/0126
USPC .......................................................... 359/279
See application file for complete search history.

(56) References Cited

FOREIGN PATENT DOCUMENTS

CN 103969824 A 8/2014

OTHER PUBLICATIONS

ISR for International Application No. PCT/ES2021/070719 mailed Feb. 10, 2022.
Written Opinion for International Application No. PCT/ES2021/070719 mailed Feb. 10, 2022.
Zheng Xuejie et al, "Compact LCOS-SLM Based Polarization Pattern Beam Gener", Journal of Lightwave Technology, IEEE, USA, vol. 33, No. 10, doi: 10.1109/JLT.2015.2395256, Issn 0733-8724, (May 15, 2015), pp. 2047-2055, (Jun. 11, 2015), XP011584428 [ID] 1-8 * figure 2 *.

(Continued)

*Primary Examiner* — William Choi
(74) *Attorney, Agent, or Firm* — LADAS & PARRY LLP

(57) ABSTRACT

An instrument for the manipulation of the light wavefront, and a method for the manipulation of the light wavefront. The instrument for the manipulation of the light wavefront comprises: two or more active light modulation areas, and an optical system that determines an optical path between the active light modulation areas, which conjugates the planes (2, 6; 9, 12) of the active light modulation areas, the optical system comprising at least one mirror (4; 11) and at least one lens (3, 5; 10), wherein the active light modulation areas have a phase modulation depth of equal to or less than π radians.

8 Claims, 3 Drawing Sheets

(56) References Cited

OTHER PUBLICATIONS

Arias A. et al, "Simultaneous rotation, orientation and displacement control of birefringent microparticles in holographic optical tweezers", Optics Express, US, (Jan. 14, 2013), vol. 21, No. 1, doi: 10.1364/OE.21.000102, ISSN 2161-2072, p. 102, XP055873654 [ID] 1-6,8 * figure 2 *.
Panezai Spozmai et al, "Direct and complete calibration of phase modulation depth of LCOS by using double exposure digital holography", Proceedings of SPIE, IEEE, US, (Dec. 19, 2013), vol. 9045, doi: 10.1117/12.2038174, ISBN 978-1-62841-730-2, pp. 90450N-90450N, XP060032215 [A] 1-8 * the whole document *.
Baiheng Ma et al, "Improvement of the performance of the twisted-nematic liquid-crystal display as a phase modulator", Applied Optics, Optical Society of America, Washington, DC, US, vol. 50, No. 17, doi:10.1364/AO.50.002588, ISSN 0003-6935, (Jun. 10, 2011), pp. 2588-2593, (Jun. 3, 2011), XP001563558 [A] 1-8 * the whole document *.
L. Zhu et al "Arbitrary manipulation of spatial amplitude and phase using phase-only spatial light modulators", Scientific Reports. 2014;4(1):1-7.

INSTRUMENT FOR MANIPULATING A LIGHT WAVEFRONT AND METHOD FOR MANIPULATING A LIGHT WAVEFRONT

CROSS REFERENCE TO RELATED APPLICATIONS

This application is a U.S. National Stage Application under 35 U.S.C. § 371 of International Application No. PCT/ES2021/070719 which was filed on 4 Oct. 2021, which claims priority from Spanish Application No. P202031012 filed 6 Oct. 2020 the disclosures of which are incorporated in their entirety by reference herein.

FIELD OF THE INVENTION

The present invention relates to an instrument for the manipulation of the light wavefront and a light wavefront manipulation method, which function by means of spatial phase modulation.

BACKGROUND OF THE INVENTION

Spatial light modulators are devices that modify the properties of light, such as amplitude, phase, or the polarization of the optical field. There is a strong interest in spatial phase modulators for adaptive, diffractive and holographic optic applications.

Modulators based on liquid crystal technology have been commonly used for this type of application due to their simple operation. These devices are comprised of an array of cells with liquid crystal molecules.

In reflection modulators, the cells have a transparent electrode on one side and another electrode attached to a mirror. Phase modulation occurs through a change in birefringence in the material when the molecules align with the electric field subsequent to applying a voltage between the two electrodes. Phase modulation depth is mainly determined by the thickness of the cell and the birefringence coefficient of the material.

Theoretically, a spatial phase modulator with a modulation depth of $2\pi$ radians (in the wavelength range of interest) is sufficient to represent wrapped phase maps and to obtain a diffraction efficiency close to 100% in the first instance. However, some devices, initially designed for rapid amplitude modulation, may have more reduced phase modulation depths. In such a case, the diffraction efficiency of the unwrapped phase maps is reduced, with a consequent loss of applicability.

There are currently proposals for configurations to control spatially and simultaneously the phase and polarization of light. See, for instance, Zheng X, Lizana A, Peinado A, et al. "Compact LCOS-SLM Based Polarization Pattern Beam Generator", Journal of Lightwave Technology. 2015; 33(10):2047-2055, or Arias A, Etcheverry S, Solano P, et al. "Simultaneous rotation, orientation and displacement control of birefringent microparticles in holographic optical tweezers", Optics Express. 2013:21(1):102.

Other documents describe proposals for the spatial and simultaneous control of the amplitude and phase of light, such as Zhu L, Wang J. "Arbitrary manipulation of spatial amplitude and phase using phase-only spatial light modulators", Scientific Reports. 2014; 4(1):1-7.

In all these cases, spatial light modulators composed of liquid crystal with a phase modulation depth equal to or greater than $2\pi$ radians in the visible spectral range have been used. These modulators function well in the applications mentioned, but are highly expensive.

SUMMARY OF THE INVENTION

The object of the present invention is to provide an instrument for light wavefront manipulation and a method of manipulating the light wavefront that provides an alternative to the use of spatial light modulators having a phase modulation depth equal to or greater than $2\pi$ radians.

The invention provides an instrument for light wavefront manipulation, comprising:
  two or more active light modulation areas, and
  an optical system that determines an optical path between the active light modulation areas, which conjugates the planes of the active light modulation areas, the optical system comprising at least one mirror and at least one lens.
wherein the active light modulation areas have a phase modulation depth of equal to or less than $\pi$ radians.

The invention also provides an instrument for light wavefront manipulation, comprising:
  two or more active areas of light modulation on a single modulator, and
  an optical system that determines an optical path between the active light modulation areas and comprising two mirrors and one lens, two beam splitters, each adjacent to an active light modulation area, and a screen, the image of an active light modulation area being formed on another active light modulation area by means of the lens,
wherein the active light modulation areas have a phase modulation depth of equal to or less than $\pi$ radians The invention also provides a method of manipulating the light wavefront, employing an instrument for light wavefront manipulation of the invention.

The use of modulators or active areas of light modulation that have a phase modulation depth of less than $2\pi$ radians allows the instrument to be considerably less costly, obtaining equivalent modulation results.

Further features and advantages of the present invention will be apparent from the following detailed description of an illustrative embodiment of the object thereof in connection with the accompanying figures.

BRIEF DESCRIPTION OF THE DRAWINGS

A non-limiting example of the object of the invention is shown below, with reference to the accompanying drawings wherein.

DETAILED DESCRIPTION OF HE INVENTION

The present invention discloses a method for phase modulation based on the spatial, coherent addition of two (or more) electromagnetic fields, although, for the sake of simplicity, henceforth we only consider the sum of two fields:

$$E_1(x,y)+E_2(x,y)=E_T(x,y)$$

where $E(x,y)=A(x,y)\cdot e^{-i\varphi(x,y)}$, $A(x,y)$ represents the amplitude of the field, which in the case considered herein does not vary spatially ($A(x,y)=A$), and $\varphi(x,y)$ the spatial phase distribution, or phase map. Subscripts 1, 2, T, represent the first and second fields to be added, and the total field, respectively.

Thus, we find that the total field $E_T(x,y)$ is:

$$E_T(x,y)=A_1\cdot e^{-i\varphi_1(x,y)}+A_2\cdot e^{-i\varphi_2(x,y)}=A_T\cdot e^{-i\varphi_T(x,y)}$$

where $\varphi_T(x,y)=\varphi_1(x,y)+\varphi_2(x,y)$ is a spatial sum of phasors. Since the amplitude of both fields is constant, only the sum of the phase term is relevant, so henceforth we refer to the sum of electromagnetic fields as the sum of phase maps.

With this method any phase map can be replicated, for instance, using modulators with a low birefringence coefficient (i.e. a lower dynamic range of phase modulation), which are usually faster and cheaper.

To ensure that the sum of the phase maps is exact and no additional terms are being added as a result of the propagation of the wavefront it is important that both phase maps are in conjugate planes. In the preferred configuration of the invention, these conjugate planes coincide with the pupil planes of the system.

Figure 1:
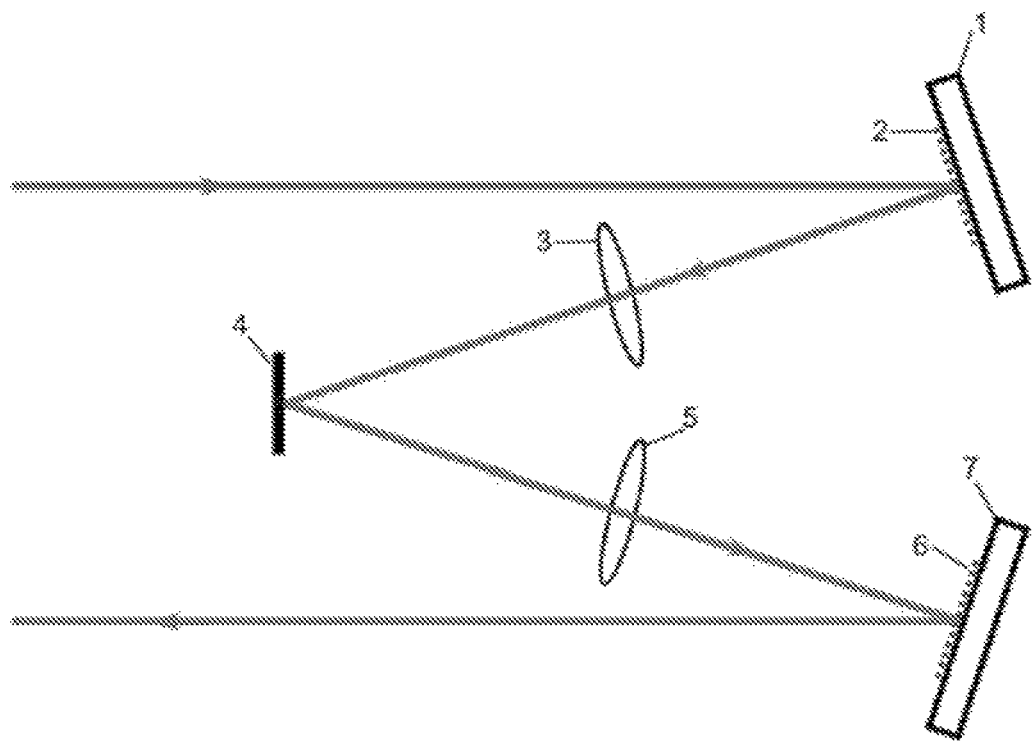
FIG. 1 shows an embodiment of an instrument for light wavefront manipulation of the invention.
Figure 2:
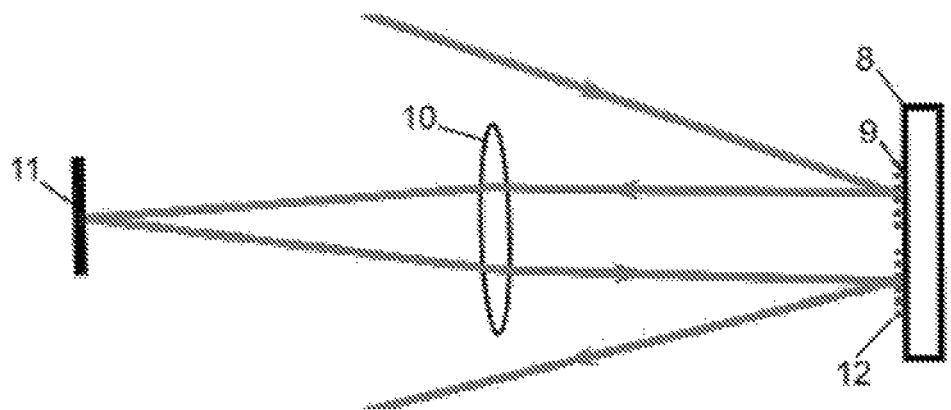
FIG. 2 shows another embodiment of an instrument for light wavefront manipulation of the invention.
Figure 3:
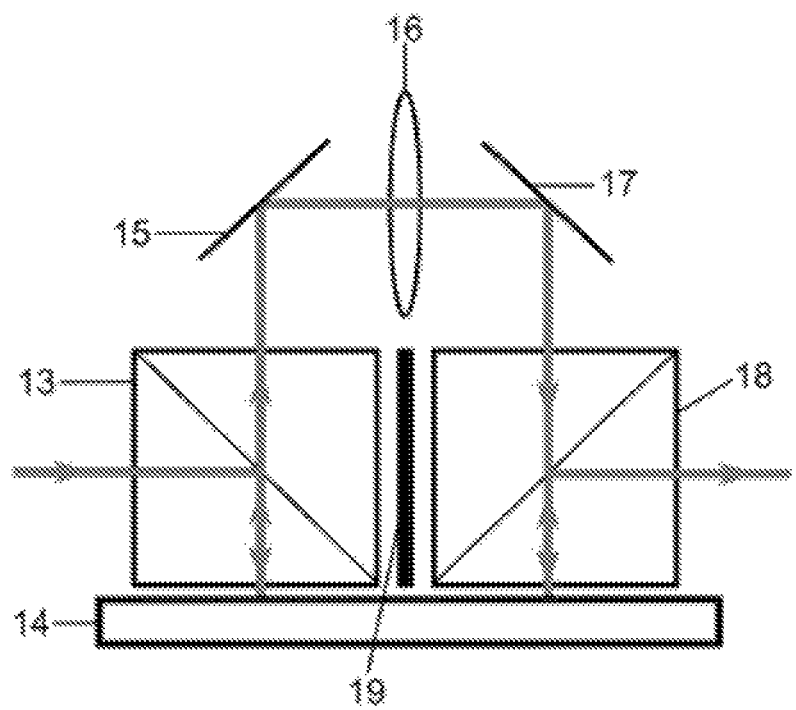
FIG. 3 shows another embodiment of an instrument for light wavefront manipulation of the invention.

This method can be carried out essentially in two different configurations: using two modulators 1, 7 in series and having the optical path pass once through each (FIG. 1), or using a single phase modulator 8, 14 with its active area divided into two halves and having the optical path pass once through each half (FIGS. 2 and 3).

In particular, the preferred form of the present invention discloses a phase mapping system where two spatial light modulators 1, 7 are used, arranged in series, where the optical path passes once through each (FIG. 1). Between both modulators 1, 7, an optical unit magnification system combines the plane of the first modulator 2 with that of the second modulator 6, enabling the phase maps to be precisely and rigorously added together.

The control of the total phase map generated ($\varphi_T(x,y)$) is carried out by means of software. Phase maps can be calculated to represent primary or higher-order aberrations, with special interest in ophthalmic applications and adaptive optics; or by computer-generated holograms or CGH (Computer Generated Holography), with possible applications in virtual reality or photolithography systems among others. In any case, once the phase map is calculated, represented between 0 and $2\pi$ radians, we divide it by two, to distribute it between the two modulators (or two halves), according to the configuration.

The way to distribute the total phase to be modulated between the two modulators (or two halves in a single modulator) can be done essentially in two ways: i. Dividing the total phase to be modulated by two and displaying the same value in each of the modulators $$\left(\text{i.e., } \varphi_1(x, y) = \varphi_2(x, y) = \frac{\varphi_T(x, y)}{2}\right)$$

or ii. Using one modulator solely to display phase values up to its maximum modulation capacity and the second modulator to display the rest of the phase needed to generate the complete phase map.

There are two main configurations in which the system can be organized: i. The two phase modulators 1, 7 (or the two halves of the same modulator 8) can be in planes conjugated to each other, incorporating an optical system between them, as shown in FIGS. 1 and 2; or ii. Forming the image of one device on the other by means of a lens 16, without both planes being necessarily conjugated to each other, as portrayed in FIG. 3, if the extra phase generated by not conjugating planes is subsequently corrected by software. A preferred configuration of the invention is portrayed in FIG. 1 and will be detailed below.

Figure 4:
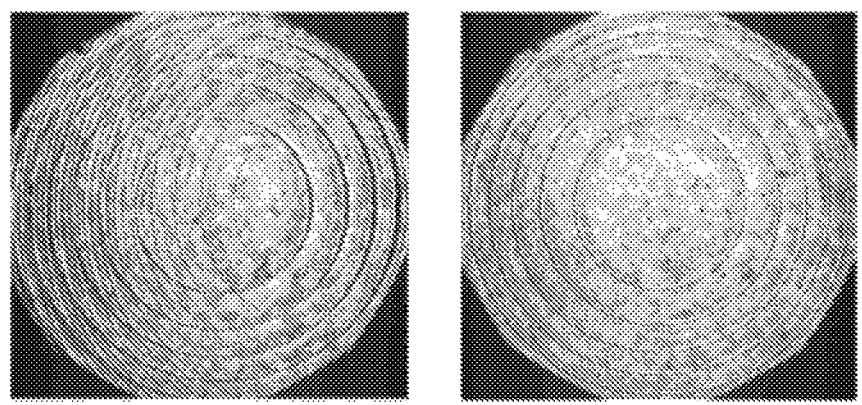
FIG. 4 shows two images of the pupil plane coinciding with the plane of the two modulators or active areas of light modulation where a 2D blur has been generated.

FIG. 2 shows one of the options for implementing the present invention. It entails using a single modulator 8 with its active area divided into two halves and independently controlled by software. The planes of each half 9, 12 are conjugated to each other by means of a double passage through a lens 10 and a mirror 11. This scheme is more compact and less costly, since only one modulator 8 and one lens 10 are used to make up the telescope. However, the alignment between the two phase maps in the exit pupil plane is exacting. The right-hand panel of FIG. 4 illustrates the coincidence of pupils of a wrapped phase after optimal alignment. This system is highly sensitive to lens rotation and offsets (lens 10, in FIG. 2), asymmetrically blurring one phase map with respect to another, as shown in the left-hand panel of FIG. 4. Non-optimal alignment can add artifacts and noise to the diffraction pattern and the images through the system, although the possibility exists of compensating for this by means of software.

Another of the experimental configurations designed is outlined in FIG. 3. In this configuration, as in that outlined in FIG. 2, a single modulator 14 is used, and this could be made even more compact than that described above, thanks to the use of two beam splitter cubes 13, 18, ensuring the normal incidence on the two halves of the modulator 14 and on the lens 16 that connects them, thanks to the two mirrors 15, 17 at 459 that redirect the optical path, reducing the possibility of the appearance of asymmetric blurring at the conjugate pupils (FIG. 4, left). In addition to the components detailed above, a screen 19 is added that blocks the light transmitted by the beam splitter 13 to the point of entry, in order to prevent undesired reflections. In this case, the lens 16 may form the image of the first half on the second with a unit magnification if the distance between said lens 16 and the halves of the modulator 14 is twice its focal length. If this requirement is not met, the two halves would not be conjugated, and an additional spherical wavefront generated by the propagation of the wavefront would need to be compensated by means of software, as indicated in the paper by Goodman, Joseph W, introduction to Fourier optics. Roberts and Company Publishers, (2005).

FIG. 1 portrays an experimental configuration of the method described, using two modulators 1, 7 and an optical telescope formed by two lenses 3, 5 and a mirror 4 conjugating the pupil planes 2, 6 between them.

In FIG. 2, the experimental system presented enables the use of the method described using a single modulator 8, where the different areas of the device 9, 12 are conjugated to each other by a telescope thanks to a double passage through a lens 10 and a mirror 11.

FIG. 3 portrays a more compact arrangement of the system in which a single lens 16 forms the image of the first half on that of the second. The beam bears on the first half of the modulator 14 in normal incidence by means of a beam splitter 13, while the beam transmitted is blocked by a screen 19. The beam reflected by the modulator 14 is redirected by two mirrors 15, 17 at 45 degrees to ensure its normal incidence on the lens 16 and the second half of the modulator 14. A second beam splitter 18 returns the modulated beam in the same direction of entry.

FIG. 4 shows two images of the pupil plane coinciding with the plane of the two modulators 1, 7 (in the preferred experimental configuration of the invention, outlined in FIG. 1), where a 2D blur has been generated. In the panel on the left it may be seen how one of the modulators coincides with the pupa plane and is well defined in its entirety, while this is not the case with the second modulator, where the horizontal direction is slightly out of focus, in addition to being displaced one from the other. The optimal situation of the experimental system is portrayed in the right-hand panel, where both phase maps coincide entirely and are well-defined throughout.

Figure 5:
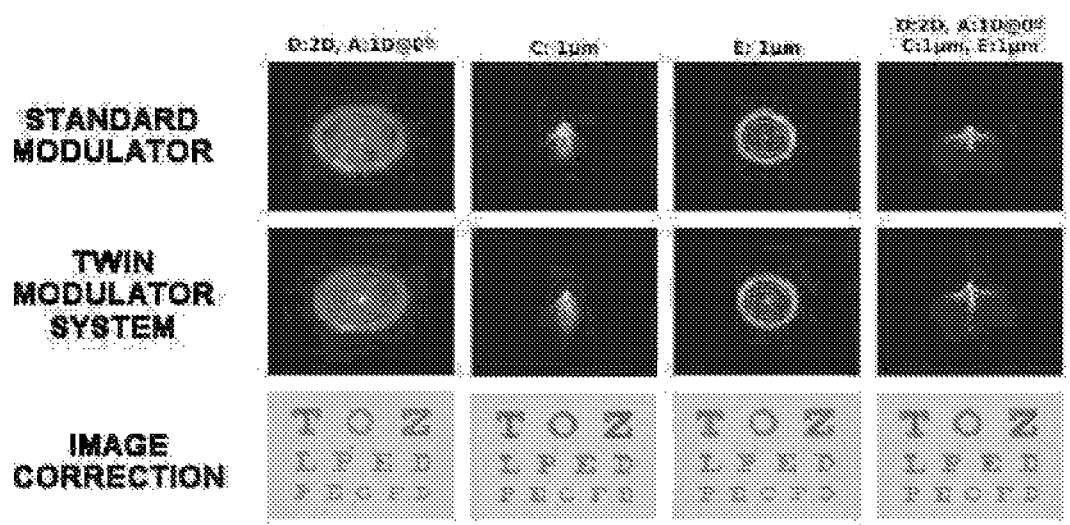
FIG. 5 shows a comparison of experimental modulation results obtained with a standard phase modulator with a modulation depth of $2\pi$ radians and two modulators with a modulation depth of approximately $\pi$ radians in the configuration portrayed in FIG. 1.

FIG. 5 compares the experimental modulation results, obtained with a standard phase modulator with a modulation depth of $2\pi$ radians, and two modulators 1, 7 with a modulation depth of approximately $\pi$ radians in the configuration shown in FIG. 1. The first two rows compare the point spread functions (PSFs) obtained with the different aberrations generated and specified in the columns (D: Blur, A: Astigmatism, C: Comma, E: Spherical aberration). The units of blur and astigmatism are dioptres (D) and those of comma and spherical aberration, micrometers ($\mu$m). The last row shows the image formation of a visual stimulus when the aberrations specified in the different columns have been generated with a standard modulator whose modulation depth is $2\pi$ radians, and then corrected by the modulation system described herein, wherein the planes of the modulators 1, 7 are conjugated.

The following numerical references are associated with the different elements that integrate the invention and its embodiments:

1. Spatial light modulator.
2. Pupil plane in the first modulator.
3. System lens.
4. Mirror.
5. System lens.
6. Pupil plane in the second modulator, conjugated with 2.
7. Spatial light modulator.
8. Spatial light modulator.
9. Pupil plane at the first part of the modulator.
10. System lens.
11. Mirror.
12. Pupil plane at the second part of the modulator, conjugated with 9.
13. Beam splitter.
14. Spatial light modulator.
15. Mirror.
16. Lens.
17. Mirror.
18. Beam splitter.
19. Beam blocking screen.

DETAILED DESCRIPTION OF A PREFERRED EMBODIMENT OF THE INVENTION

A preferred embodiment of the invention is shown schematically in FIG. 1. It consists of a system for adding two identical and spatially coincident phase maps. This is achieved by the use of two spatial light modulators 1, 7 located in optically conjugated planes 2, 6. These planes are conjugated by means of a unitary magnification telescope formed by two lenses 3, 5 and a mirror 4.

A crucial condition for the proper implementation of the present invention is that the phase maps of the individual modulators 1, 7 coincide spatially. This can be verified by forming an image of the exit pupil of the system with a camera, while showing a wrapped phase map at the modulators 1, 7. A primary alignment consists of the physical movement of the devices, subsequently to achieve fine alignment by means of the digital manipulation of the phase maps. While the coincidence of the outlines of the wrapped phase maps ensures transverse alignment, a similar, thin thickness thereof ensures axial coincidence. An example of this coincidence is shown in the right-hand panel of FIG. 4. The opposite case, without transverse and axial coincidence, is shown in the left-hand panel of FIG. 4.

Within this configuration of the invention, in FIG. 5 we show, by way of an example, different Point Spread Functions (PSFs) of phase maps of primary aberrations, (blur, astigmatism, comma, or spherical aberration), of great interest in visual optics. The first row of FIG. 5 portrays the PSFs corresponding to various combinations of these aberrations, obtained with a standard phase modulator capable of modulating the entire phase range of $2\pi$, and in the second row, the PSFs of the same aberrations, but generated with two phase modulators 1, 7 with a modulation depth limited to approximately $\pi$ radians, using the configuration described herein. In the third row, images of a visual test are shown where the same aberrations defined in each column have been generated by the standard modulator and corrected by the two modulators 1, 7 in the configuration described and outlined in FIG. 1.

Operation of the instrument is possible provided that modulation exists (i.e., that the modulation of the modulators or active modulation areas is greater than 0 radians). The final operation depends on whether a modulation of $2\pi$ can be achieved. If the modulators modulate up to $\pi$, two modulators are sufficient. If the modulators modulate $\pi/2$, four would be required, etc. The more modulators are employed, the more complicated the system will be to execute experimentally and some efficiency may be lost, but it is still possible.

Although some embodiments of the invention have been described and represented, it is clear that modifications may be introduced to them within the scope of the same, and that the invention should not be considered limited to these embodiments, but only to the content of the following claims.

The invention claimed is:

1. An instrument for the manipulation of the light wavefront, comprising:
   two or more active light modulation areas, and
   an optical system that determines an optical path between the active light modulation areas, which conjugates the planes (2, 6; 9, 12) of the active light modulation areas, the optical system comprising at least one mirror (4; 11) and at least one lens (3, 5; 10),
   wherein the active light modulation areas have a phase modulation depth of equal to or less than $\pi$ radians.

2. An instrument for the manipulation of the light wavefront as claimed in claim 1, wherein the active light modulation areas are located in independent spatial light modulators (1, 7).

3. An instrument for the manipulation of the light wavefront, as claimed in claim 2, wherein the optical system comprises two lenses (3, 5) and a mirror (4) that conjugate the planes (2, 6) of the active light modulation areas.

4. An instrument for the manipulation of the light wavefront, as claimed in claim 1, wherein the active light modulation areas are located in the spatial light modulator (8) itself.

5. An instrument for the manipulation of the light wavefront, as claimed in claim 4, wherein the active light modulation areas are independently controlled by software.

6. An instrument for the manipulation of the light wavefront, as claimed in claim 4, wherein the optical system comprises a lens (10) and a mirror (11) that conjugate the planes (9, 12) of the active light modulation areas by means of a double passage through the lens (10).

7. A method for the manipulation of the light wavefront, employing an instrument for the manipulation of the light wavefront of claim 1.

8. An instrument for the manipulation of the light wavefront, comprising:
- two or more active light modulation areas on a single modulator (14), and
- an optical system that determines an optical path between the active light modulation areas and comprising two mirrors (15, 17) and one lens (16), two beam splitters (13, 18), each adjacent to an active light modulation area, and a screen (19), the image of an active light modulation area being formed on another active light modulation area by means of the lens (16),
- wherein the active light modulation areas have a phase modulation depth of equal to or less than $\pi$ radians.

\* \* \* \* \*